United States Patent [19]
Vereschagin et al.

[11] 3,785,093
[45] Jan. 15, 1974

[54] METHOD OF BONDING DIAMOND WITH REFRACTORY CERMET MATERIAL

[76] Inventors: Leonid Fedorovich Vereschagin, Kutuzousky prospekt, 10/9, kv. 231; Jury Sergeevich Konyafv, ulitsa Fersmana II, kv. 26, both of Moscow; Alexandr Vasilievich Dovbnya, Podolskyraion, Akademgorodok, ulitsa Tsentralnaya, 10, kv. 112, Moskovskaya Oblast; Evgeny Valentinovich Polyakov, Belyaevo-Bogorodskoe, 39. kv. 73, Moscow; Novgorodov, Alexandr Stepanovich, Timviyazevskaya ulitsa, 34, korpus I, kv. 51, Moscow; Abdulia Ogly Asan-Nuri, Naberezhnaya Shevchenko, ½ kv. 118, Moscow; Polikarp Avtonomovich Paly, ulitsa Zoi i Alexandra Kasmo-demyanskikh, 4, kv. 316, Moscow; Grigory Sergeevich Gevorkov, Oktyabrsky propekt 365, kv. 34, Ljubertsy Moskovsko Oblasti, all of U.S.S.R.

[22] Filed: Dec. 21, 1970

[21] Appl. No.: 100,119

[52] U.S. Cl. .................................. 51/307, 51/309
[51] Int. Cl. .......................... B24d 3/06, B24d 3/14
[58] Field of Search ..................... 51/309, 293, 297, 51/308, 307; 23/209.1 D

[56] References Cited
UNITED STATES PATENTS

| | | | |
|---|---|---|---|
| 3,136,615 | 6/1964 | Bovenkerk et al. | 51/309 |
| 3,181,933 | 5/1965 | Wentorf | 23/209.1 |
| 3,574,580 | 4/1971 | Stromberg et al. | 51/309 |
| 3,372,010 | 3/1968 | Parsons | 51/309 |
| 3,239,321 | 3/1966 | Blainey et al. | 51/309 |
| 2,828,197 | 3/1958 | Blackmer | 51/309 |

*Primary Examiner*—Donald J. Arnold
*Attorney*—Waters, Roditi, Schwartz & Nissen

[57] ABSTRACT

The diamond and cement materials to be sintered are placed in a hermetic graphite sheathing which is, in turn, arranged inside a sheathing of some low-melting metal. The latter is to be made from a metal whose melting point is lower than the temperature at which diamond will be sintered with the cermet material. The filled-up graphite sheathing is placed into a high-pressure reaction chamber and heated up until the low-melting metal gets soft. Thereafter the temperature and the pressure are raised until they are adequate for diamond to be sintered with cermet material. The softened sheathing of the low-melting material is a hydrostatic medium which provides for a uniform distribution of pressure and temperature over the entire volume of materials being sintered.

2 Claims, 2 Drawing Figures

METHOD OF BONDING DIAMOND WITH REFRACTORY CERMET MATERIAL

This invention relates to method used for bonding super-hard and cermet materials, in particular to a method of bonding diamond with refractory cement material, and can be used for manufacturing tools whose cutting tips are made of super-hard material, for instance, boring or abrasive tools.

A conventional method of bonding diamond with super-hard materials, usually powdered ones, consists in sintering them in a high-pressure reaction chamber. When sintering is performed, the mass constituted by diamond grains and cermet material powder is subjected to hot pressing at a pressure of up to 3000 bars. For a firm bonding of particles of cermet material at sintering temperatures limited by thermal resistance of diamond, all the mass to be sintered is pressed all around and impregnated with low-melting metals or their alloys, such as copper, brass, in a high vacuum or an inert medium.

Such impregnation of cermet material makes this method too complicated and detracts from the mechanical strength of the bond between the diamond and cermet material. Non-uniform distribution of pressure over the volume of the materials being sintered presents another cause for poor mechanical strength of the bond between the diamond and cermet material.

Recently a method has found application, whereby diamond is sintered with cermet materials in a high vacuum by way of their short-term heating up to a temperature of the order of 1400°C.

However this method, too, fails to ensure adequately firm bonding between the diamond and cermet material due to the sintering process being too short and to the formation of considerable thermal stresses. Besides, very high temperatures, such as used in this method, detract from the resisting capacity of diamonds, especially synthetic ones, whose thermal resistance is somewhat lower than that of the natural ones.

The object of this invention is to provide for a method of bonding diamond with cermet material which would ensure high strength of the bonding without detracting from the thermal resistance of diamond.

It is a specific object of this invention to create the conditions in a reaction chamber during sintering, which would ensure a uniform distribution of temperature and pressure over the entire volume of materials being sintered.

This object is accomplished when carrying out the method of sintering diamonds with refractory cermet materials in a high-pressure chamber according to this invention, by placing the diamond and cermet materials are in a hermetic graphite sheathing arranged, in turn, in a sheathing of a low-melting material which softens under pressure at a temperature lower than that required for sintering said materials and produces a hydrostatic medium; thereby ensuring a uniform distribution of pressure and temperature over the entire volume of materials being sintered.

The produced hydrostatic medium provides for a uniform distribution of pressure over the entire volume of the materials being sintered, which ensures reliable bonds both between the particles of cermet material and between cermets and diamonds. The hydrostatic medium also ensures a uniform withdrawal of heat from the entire volume of materials being sintered, and, a uniform distribution of thermal loads in all directions. This means that the resultant bonding is free from local thermal stresses or from stresses caused by a non-uniform pressure exerted in one of the directions.

For a better understanding of the invention, the following is a description of its specific embodiment with reference to the appended drawings, wherein.

Figure 1:
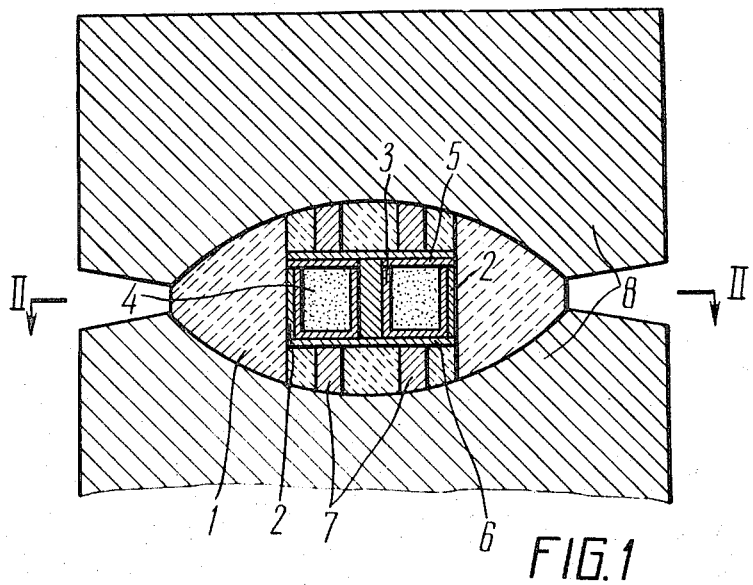
FIG. 1 shows a high-pressure reaction chamber with a sheathing of low-melting material inside, said sheathing bein filled with graphite sheathing, every one of which contains a mixture of cermet powder and polycrystalline diamond.
Figure 2:
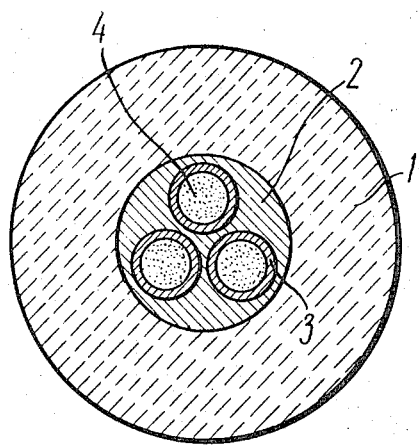
FIG. 2 is cross section through II—II of FIG. 1.

High-pressure reaction chamber 1 (FIG. 1) accomodates a container 2 made from a low-melting material and provided with three cylindrical recesses receiving graphite sleeves 3 filled up with mixture 4 of diamonds and powder of refractory cermet material. The sleeves 3 are covered with lids 5 so as to form a hermetic sheathing.

Arranged against the faces of container 2 are washers 6 which are also made from a low melting material, and electrical heaters 7 contacting plungers 8.

As the refractory cermet, a powder can be a powder of a hard alloy of WC-Co or Wc-Ti-Co may be used; while tin, lead, zinc, aluminum or their alloys may serve as low-melting metals. Materials other than metals are also suitable, providing their melting points are lower than that at which rigid bonds of materials of the mixture being sintered are formed, as a rule lower than 1000°C.

The process of bonding diamonds with cermets is carried out as follows.

Polycrystals of diamond and cermet powder are mixed up and the resultant mixture is placed in graphite sleeves 3 which have been previously set in the recesses of container 2 made from a low-melting metal.

After the graphite sleeves are filled up with said mixture, they are covered with lids 5 to produce a hermetic graphite sheathing. Thereafter container 2 is placed in reaction chamber 1, and washers 6 and electrical heaters 7 are installed. Container 2 in conjunction with washers 6 produce a hermetic low-melting sheathing. The reaction chamber is pressed between plungers 8 till the pressure exceeds 10000 bars, and electric current is passed through electrical heaters 7 to heat up the low-melting metal until it softens.

The softened metal produces a hydrostatic medium ensuring a uniform distribution of pressure and temperature over the entire volume of the materials being sintered. Now the temperature is raised and the diamonds and the cermet material are sintered together. The sintering process being over, the temperature and pressure are relieved, and the container of low-melting metal is removed from the reaction chamber. The container and the graphite sheathing are destroyed while the molded articles with the diamond sintered to the refractory cermet material are taken therefrom. These molded articles are used for manufacturing metal machining or boring tools, for instance, boring bits. For this purpose said molded articles are machined to impart to them the shape and size needed for their securing in the body of a boring bit by some kind of fitting, for instance, by press-fitting.

The above description refers to the preferable embodiment of the method for bonding diamond and cermet materials. However the application of this method allows also the heating up of a low-melting container under atmospheric pressure, with subsequent compressing for the high-pressure reaction chamber and raising the temperature to the value adequate for reliable sintering of cermet material with diamond.

The proposed method was used for making mouldings from synthetic polycrystalline varieties of diamonds (ballases), 5 mm in size, sintered with a hard alloy containing 8–15 weight per cent of cobalt. The boring bits provided with cutting tips made from such molded materials proved to be 5–10 times stronger than those with conventionally made cutting tips.

What is claimed is:

1. A method of bonding diamond and a refractory cermet powder consisting essentially of WC-Co or WC-Ti-Co by sintering under a pressure in excess of 10 kbars and at a temperature above 1,000°C. comprising charging said materials in a hermetic graphite shell; placing said shell inside a further shell made of a low-melting material selected from the group consisting of tin, lead, zinc, aluminum and alloys thereof melting below about 1,000°C; disposing said shell made of the low-melting material with said graphite shell contained thereinside in a reaction chamber; heating said shell made of a low-melting material in said reaction chamber to the melting point of said low-melting material; elevating the temperature in said reaction chamber so as to effect sintering of the diamond-cermet composition used, sintering said composition being effected in a hydrostatic envelope produced as a result of heating said low-melting material and said hydrostatic envelope providing for the throughout the bulk of the materials being sintered.

2. In a method for bonding diamond and refractory cermet material consisting essentially of WC-Co and WC-Ti-Co by sintering under high pressures and temperatures in a high pressure reaction chamber, the improvement comprising subjecting a mixture of the diamond and cermet powder to sintering temperature range of about 1000°C. to about 2000°C. and a pressure range of 10 kbars to 60 kbars in a reaction chamber which is comprised of a graphite shell and a second shell of a low melting material selected from the group consisting essentially of tin, lead zinc, aluminum, and alloys thereof having a melting point below about 1000°C, said graphite shell being disposed in said shell of the low-melting material; whereby on elevating the temperature in said reaction chamber to effect the sintering, the low melting material melts below the sintering temperature of the mixture and forms a hydrostatic envelope which provides for a uniform distribution of pressure and temperature throughout the bulk of the mixture being sintered.

* * * * *